Figure 1:
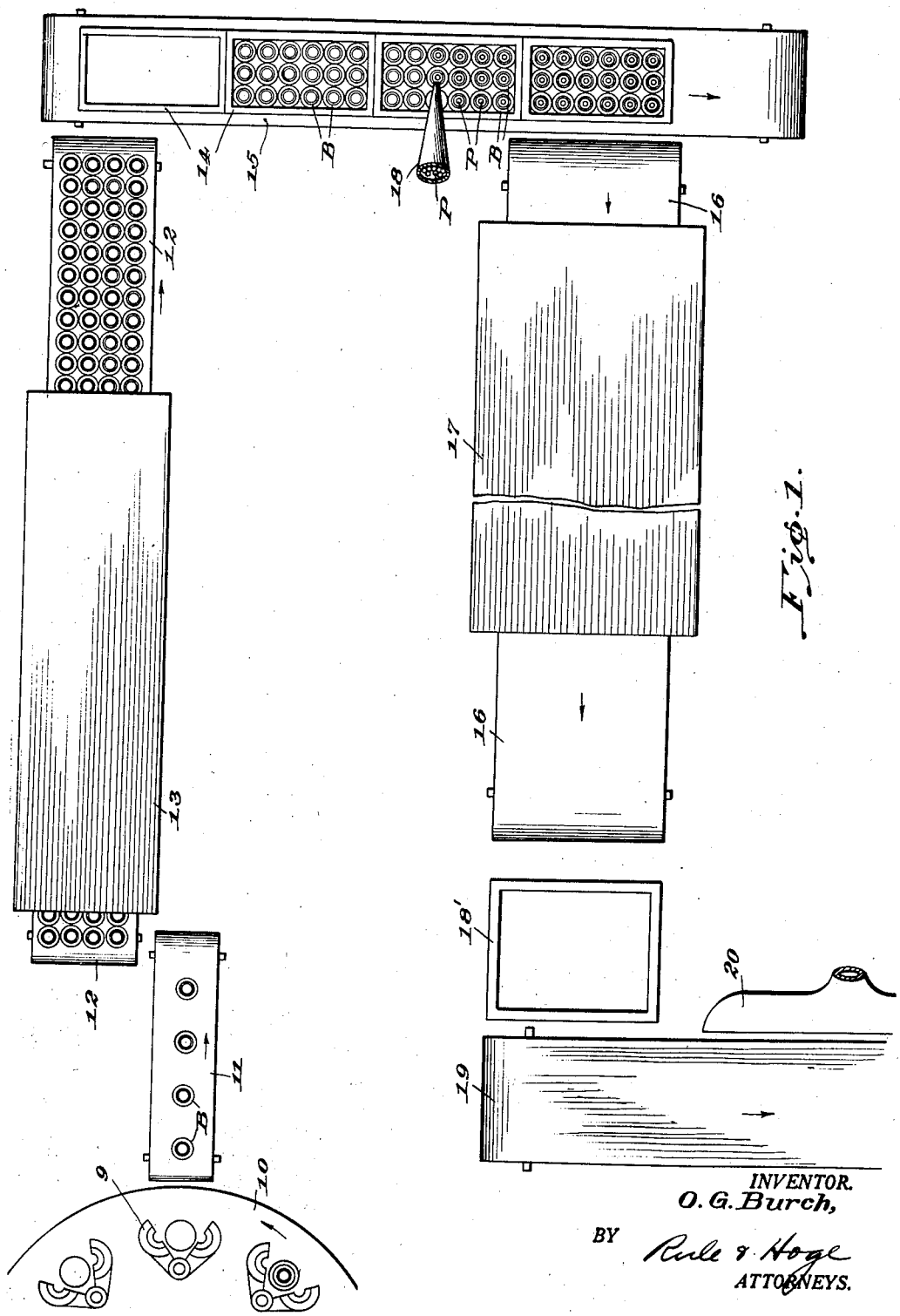

Oct. 3, 1939. O. G. BURCH 2,175,076
METHOD OF SURFACE TREATING GLASS CONTAINERS
Original Filed Sept. 25, 1936 2 Sheets-Sheet 2

INVENTOR.
O. G. Burch,
BY Rule & Hoge
ATTORNEYS.

Patented Oct. 3, 1939

2,175,076

UNITED STATES PATENT OFFICE 2,175,076

METHOD OF SURFACE TREATING GLASS CONTAINERS

Oscar G. Burch, Toledo, Ohio, assignor to Owens-Illinois Glass Company, a corporation of Ohio Application September 25, 1936, Serial No. 102,509
Renewed February 25, 1939

6 Claims. (Cl. 49—77)

The present invention relates to improvements in the art of surface treating glass or other ceramic containers. More particularly, the invention relates to a method of surface treating the interiors of glass bottles or jars.

Glass containers such as bottles and jars which are employed in the marketing of aqueous solutions are of such character that over a comparatively short period of time the alkali at and in close proximity to the interior surface thereof is leached out. If such containers are not put to immediate use but are allowed to remain exposed to the atmosphere for a considerable period of time, particularly if they are exposed to humid atmospheres, this same leaching out of the alkali will occur. Under such conditions, if this alkali is allowed to remain in the containers, an accumulation of alkali will occur and consequent corrosion of the interior surface of the containers will result.

One method that has been followed in overcoming the above noted phenomenon of leaching and consequent corrosion of the interior of the bottles consists in depositing in the bottles, prior to the annealing thereof, and while the bottles are hot, a pellet which, when subjected to the residual heat of the bottle, fires and creates within the bottles an acid gas. While this method has proven highly satisfactory in connection with all but the very small bottles, particularly bottles of the type employed in the packaging of serums and vaccines, the difficulty encountered in distributing the pellets to these small, closely spaced bottles as they issue in rapid succession from the forming machine has given rise to the present invention.

The principal object of the present invention is to provide a method of surface treating bottles and like glass articles which is adaptable for use in connection with small bottles as well as with large ones. Toward this end the invention contemplates the provision of a method of surface treating the interior of bottles wherein the bottles are conveniently grouped on trays as they issue from the annealing leer in order that they may be more readily adaptable to the reception of the individual pellets which are discharged thereinto. The trays containing the bottles in which the pellets have been individually placed are then introduced into an oven or a muffle leer and the temperature thereof is raised to a predetermined point, after which the temperature is lowered to substantially room temperature. During this heating operation, the pellets are converted into an acid gas which reacts with the interior surface of the glass bottles to produce the desired surface treatment. The bottles are subsequently removed from the trays and are washed, dried and packed.

Other objects and advantages of the invention will become more readily apparent hereinafter.

Figure 2:
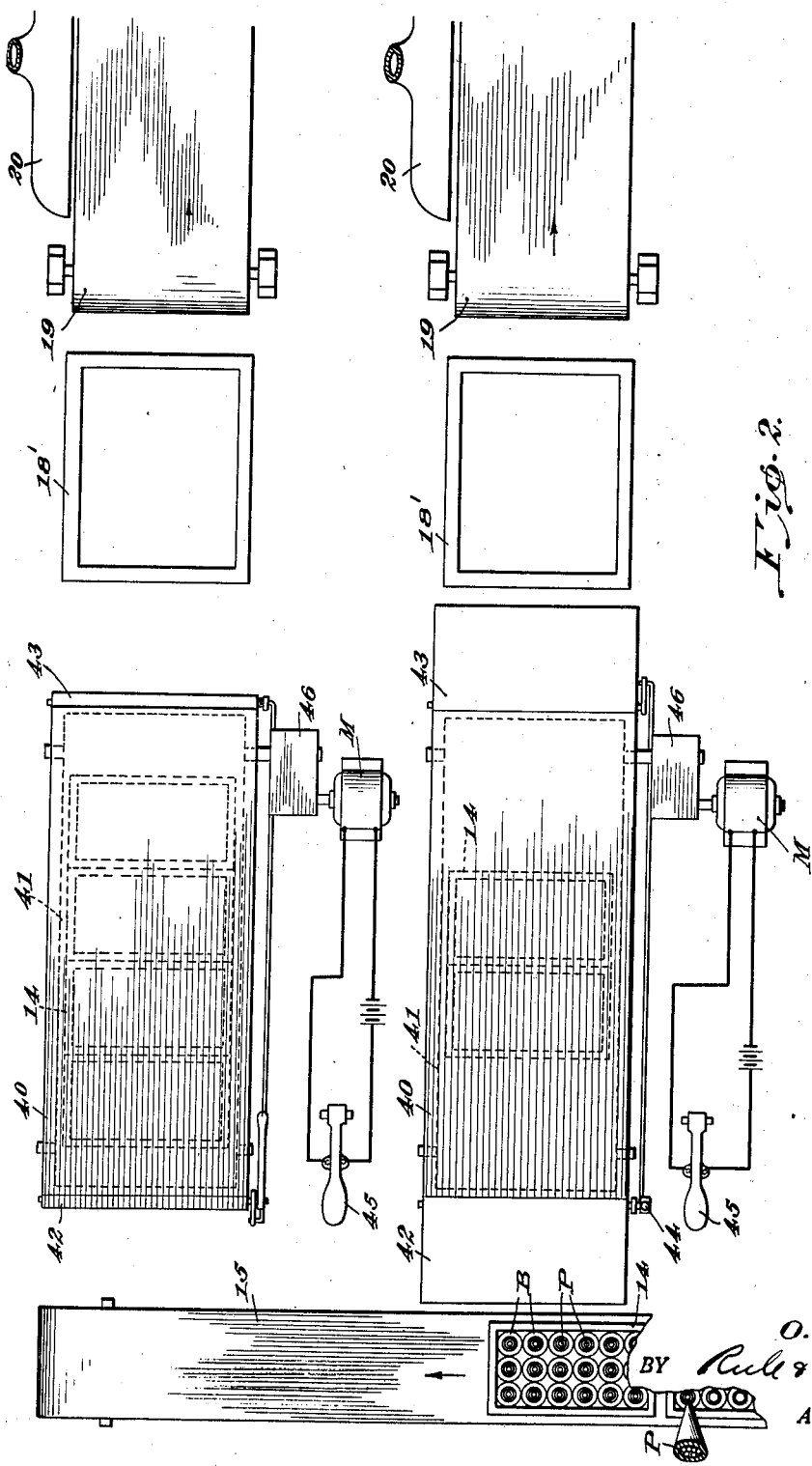

In the accompanying drawings:

Fig. 1 is a plan view, partly diagrammatic in its representation, of one form of apparatus employed for carrying out the method of the present invention; and Fig. 2 is a view similar to Fig. 1, showing another form of apparatus for carrying out the method.

Referring now to Fig. 1, the bottles B or other articles are fabricated in the molds 9 of a forming machine 10 and are delivered to a machine conveyor 11 from which they are removed and placed on the leer conveyor 12 of an annealing leer 13. After passing through the leer 13, the annealed bottles are removed from the leer conveyor 12 and are placed in closely grouped formation in metal trays 14 which are disposed on a conveyor 15. The trays 14 containing the bottles are conducted by the conveyor 15 to the conveyor 16 of a muffle leer 17 or oven. During the transfer of the trays from the conveyor 15 to the conveyor 16, a small amount of sulphur or its equivalent, preferably in the form of a pellet P, is deposited in each bottle by a pellet depositing or other dispensing apparatus 18 which may be automatic in operation or otherwise. The material deposited and the quantity thereof is designed on heating in contact with air to volatilize directly to an acidic gas, or as a volatile salt such as ammonium sulphate or sulphite which, on heating, volatilizes to render gases of the desired properties. The acidic gases thus liberated come in contact with the interior glass surface of the bottles and neutralize a large amount of the alkali at or near the glass surface, thereby rendering the interior surfaces of the bottles permanently resistant to corrosion by neutral or acidic solutions.

The quantity of sulphur deposited in each container varies with the interior surface area thereof, and for small vaccine bottles or containers of a similar size, a pellet of sulphur weighing approximately .05 gram is employed.

In order to bring about this condition of volatilization of the pellets P, the trays 14 containing the bottles B in which the pellets P have been deposited, are removed from the conveyor 15 and are placed on the conveyor 16 by means of which they are conducted through the muffle leer 17, so called because provision is made for preventing the products of combustion from coming into contact with the bottles. In the muffle leer 17, the temperature of the bottles is gradually raised from approximately 200° F. to from 950° to 1000° F. and is then gradually reduced so that the bottles emerge from the leer at substantially room temperature. This temperature treatment is designed to bring about the desired chemical reaction above referred to.

The bottles are removed from the trays 14 at the discharge end of the conveyor 16 and are washed in a water tank 18' to remove the coating of alkali sulphate or alkali sulphite that has formed on the interior surface thereof. The washed bottles are then placed on a conveyor 19 and are dried by means of warm air blowers 20 prior to being packed for marketing.

In the form of the apparatus shown in Fig. 2, the fabricated and annealed bottles in which the pellets P have been deposited are removed from the conveyor 15 at the receiving end or ends of one or a series of adjacent heating ovens 40. The ovens 40 are preferably electrically heated, but, if desired, muffle ovens that exclude the products of combustion from the bottles to be heated may be employed. Furthermore, while two adjacent ovens have been disclosed in the present application, it is obvious that any number of ovens may be employed. Irrespective of the number of ovens employed or of the type selected, the essential features of the invention are at all times preserved.

The ovens 40 are substantially identical in construction and a description of one will suffice for the other. Each oven 40 is provided with a conveyor 41 for conducting the trays 14 through the same. The receiving and discharge ends of the oven are adapted to be closed by doors 42 and 43 respectively, which doors are jointly operated by means of an operating lever 44 positioned near the receiving end of the oven. The conveyor 41 is designed to be actuated at will by means of a treadle switch mechanism 45 which serves to close or open an electrical circuit through a motor M which drives the conveyor 41 through a gear reduction device 46.

The trays 14 containing the bottles B, in which the pellets P have been deposited, are suitably distributed to the various ovens 40 which are operated independently of each other. As each tray is placed on one or another of the conveyors 41, one operator closes the respective treadle switch 45 to advance the conveyor 41 and make room for a succeeding tray. When the oven 40 is filled to its capacity, the oven doors 42 and 43 thereof are closed. The temperature of the filled oven is raised to approximately 750° F. and the oven is allowed to cool to room temperature.

Upon cooling of the oven 40, the oven doors 42 and 43 are opened by means of the lever 44 and, as the conveyor 41 is intermittently advanced to receive a supply of untreated bottles, the treated bottles in the trays 14 are successively removed from the discharge end thereof for washing in the water tank 18' and for drying on the conveyor 19 by means of the blower 20 as previously described.

Modifications may be resorted to within the scope and spirit of the appended claims.

I claim:

1. The method of treating the interior surfaces of small vaccine bottles and glass containers of a similar size which comprises removing said containers from an annealing leer in which they are annealed and grouping the same in a series of trays, depositing in each container in said trays approximately one-twentieth gram of sulphur, conveying said trays and containers to the receiving end of an electrically heated oven, placing said trays and containers in said oven, raising the temperature of said oven to a degree of heat sufficient to burn said sulphur, allowing said oven to cool with the trays and containers therein, removing said trays and containers, washing said containers, and drying the same.

2. The method of surface treating the interior of glass containers which comprises annealing the containers, depositing in each container a quantity of a solid which when fired creates an acidic gas, and subjecting said containers with the solid therein to an atmosphere of heat to fire the solid and thereby create said acidic gas within the same.

3. The method of surface treating the interior of glass containers which comprises annealing the containers, depositing in each container a quantity of a solid which when fired creates an acidic gas, placing said containers with the solid therein in an oven, raising the temperature of said oven to surround said containers with an atmosphere of heat capable of firing the solid and allowing said oven to cool with the containers therein.

4. The method of surface treating the interior of small vaccine bottles and glass containers of a similar nature which comprises annealing the containers, depositing in each container a quantity of a solid which when fired creates an acidic gas, subjecting said containers with the solid therein to an atmosphere of heat to fire the solid and thereby create said acidic gas within the same while simultaneously excluding the containers from contact with the products of combustion which generate said heat.

5. The method of surface treating the interior of glass containers which comprises annealing the containers, depositing in each container a quantity of a solid which when heated, decomposes and creates an acidic gas, subjecting said containers with the solid therein to an atmosphere of heat to decompose the solid and thereby create said acidic gas within the same while simultaneously excluding the containers from contact with the products of combustion which generate said heat.

6. The method of surface treating the interior of glass containers which comprises annealing the containers, depositing in each container a quantity of a solid which when heated, decomposes and creates an acidic gas, subjecting said containers with the solid therein to an atmosphere of heat to decompose the solid and thereby create said acidic gas within the same while simultaneously excluding the containers from contact with the medium which generates said heat.

OSCAR G. BURCH.